United States Patent [19]

Weasel, Jr.

[11] 4,434,623
[45] Mar. 6, 1984

[54] HYDRO-COOLING AIR LOCK

[76] Inventor: George E. Weasel, Jr., Nhy-Temp, Inc., Hwy. 65, McClure, Ohio 43534

[21] Appl. No.: 439,919

[22] Filed: Nov. 8, 1982

[51] Int. Cl.³ .............................................. F25D 17/02
[52] U.S. Cl. .......................................... 62/64; 62/70; 62/239
[58] Field of Search ............................ 62/64, 70, 239

[56] References Cited

U.S. PATENT DOCUMENTS 2,303,867 12/1942 Stebbins ................................ 62/64
2,751,882 6/1956 Coyner .................................. 62/64
3,672,182 6/1972 Stowasser et al. .................... 62/70

Primary Examiner—Ronald C. Capossela
Attorney, Agent, or Firm—Wendell Coffee

[57] ABSTRACT

Vegetation is hydro-cooled, and purged of oxygen-containing air while in an enclosed trailer. Although the trailer itself has doors pivoted over an opening at the rear, the hydro-cooling process occurs while the trailer is backed against an alcove. The alcove has an air seal around the opening in the trailer. Chilled water from a refrigeration unit is sprinkled from a sprinkler built into the top of the trailer onto the vegetation. The water, after flowing over the vegetation, runs out the rear of the trailer into a drain, which is located in the floor of the alcove. To remove the oxygen within the trailer to a minimum, a nitrogen cap is maintained over the chilled water reservoirs and heat exchangers of the refrigeration unit so that oxygen from the air will not dissolve into the cooling water. To purge the oxygen from the trailer, while being hydro-cooled, nitrogen is released within the trailer beneath the vegetation. The air seal on the alcove prevents oxygen-containing air from contaminating the trailer during this process.

14 Claims, 5 Drawing Figures

HYDRO-COOLING AIR LOCK

CROSS REFERENCE TO RELATED APPLICATIONS

Although this application is concerned with the same subject matter as my prior application, Ser. No. 305,952, filed Sept. 28, 1981, no claim to priority is made at this time.

BACKGROUND OF THE INVENTION

1. Field of the Invention

This invention relates to vegetation and more particularly to fresh produce and the transportation of said vegetation.

2. Description of the Prior Art

Commercial hydro-coolers have been in commercial operation for some time. In these hydrocoolers, harvested produce was loaded in crates or lugs and placed upon a conveyor. The loaded conveyor was moved into a chamber where chilled water was flushed over it to quickly reduce the temperature of the produce to the required shipping temperature. After the cooling process, it was also customary to move the produce out of the cooling chamber, either by hand or by fork lift, to move it through ambient atmosphere into a refrigerated truck, trailer or railroad car. Often this refrigerated truck, trailer, or railcar was not refrigerated at the time the produce was loaded into it. It may be seen that not only a certain amount of inefficiency took place because of the addition of heat to the produce, but also there would be an undesirable temperature fluctuation of the produce.

Before this invention, fresh harvested produce, such as radishes, had been loaded into trailers and chilled by a water flood. The water was flooded into the trailer by inserting water pipes through the open door of the trailer and leaving the doors open for the water to drain from the trailer after it had flushed the produce. After the produce was chilled, the normal atmosphere was purged from the trailer and from the produce by flooding the area with nitrogen gas as produced by liquid nitrogen. Thereafter, the trailer was closed as tightly as possible and sent to its destination. During transportation, conventional refrigeration units were provided to keep the contents as near as possible at 32° F.

SUMMARY OF THE INVENTION

1. New Functions and Surprising Results

I have invented an alcove structure to facilitate the hydro-cooling of vegetation within a transport container.

I use the term "vegetation" to include a wide variety of material. It will be understood, that fresh produce, such as vegetables or fruit, for example sweet corn, cantalopes, or radishes are still "live". Because the produce has been severed from the remainder of the plant in the harvesting process, does not mean that it is no longer alive. This is also true of fresh flowers and complete plants, such as "potted" plants. Although transportation of vegetation primarily concerns fresh produce, this patent application is not limited to sweet corn, radishes and the like.

The term "transport containers" is intended to have a wider definition than merely a trailer which is pulled along a highway by truck or tractor. The other common container in commercial use today is a box which may be carried by many means, for example, on the flatbed of a trailer, railcar or ship.

With vegetation and particular produce, it has long been recognized that it is desirable to maintain the produce at a reduced temperature. There is some recognition that it is desirable to have a controlled atmosphere.

I have invented improved equipment so that harvested produce may be hydro-cooled very rapidly within the transport container itself. This is much more efficient chilling operation because after the chilling there is no heat loss by taking the produce through the ambient temperatures during the process between the chilling and the placing it in the transport container. Furthermore, by having this done in a closed space, the chilling is more efficiently performed.

It is possible, at the same time as chilling is taking place, to control the atmosphere. The atmosphere is better controlled because the reduction of the oxygen-containing ambient air is reduced at the time the produce is still at ambient temperatures. As the produce or vegetation is chilled, it is in the oxygen-free nitrogen atmosphere. Not only is this a more efficient operation resulting in the saving of the oxygen-free gas, but also results in an improved treatment of the vegetation through a process not entirely understood. I.e. empirically the improved results can be observed, however, the reason for these improved results is not entirely understood.

I have achieved my desired results of more efficient cooling, quicker cooling, and more efficient gas exchange at a more desirable time, by backing the trailer against an alcove. The alcove is a stage-like booth or chamber having a back wall, roof, floor, and two sides. The open side of the alcove has an air lock or air seal, so that when the trailer is backed against it, a reasonable air-tight seal is formed between the transport container and the alcove. A door is provided through one of the sides of the alcove so that a person may enter and open the doors of the trailer. Then the hydro-cooling and nitrogen flushing can proceed. The water, after it is flushed through the vegetation within the transport container, drains through the floor of the alcove. After the atmosphere has been substantially changed from oxygen-containing air to an atmosphere pure in nitrogen, and the vegetation is chilled to the desired temperature, a person again enters the side door, this time being provided with an oxygen mask, to close the doors so that there is a minimal amount of oxygen entering the transport container and almost no heat loss.

To reduce the oxygen to a minimum, it is desirable to place a nitrogen cap over the water in the reservoir, heat exchangers and the like in the refrigeration unit. If this is not done, the water, during the chilling process, will absorb considerable oxygen; and, an appreciable amount of the absorbed oxygen will be released from the water during the produce cooling process. The reduction of oxygen in the transport container is more difficult because of this.

Therefore, I have achieved the surprising results of efficiently chilling vegetation in a controlled atmosphere and being able to transport vegetation and to hold vegetation for a longer period of time while maintaining the quality of the vegetation. Furthermore, it may be seen that the total function of the parts of my invention far exceeds the sum of the functions of the individual elements such as seals, drains, and sprinklers.

2. Objects of this Invention

An object of this invention is to transport and store vegetation without deterioration of the quality thereof.

Further objects are to achieve the above with a device that is sturdy, compact, durable, lightweight, simple, safe, efficient, versatile, ecologically compatible, energy conserving, and reliable, yet inexpensive and easy to manufacture, transport, adjust, operate and maintain.

Other objects are to achieve the above with a method that is versatile, ecologically compatible, energy conserving, rapid, efficient, and inexpensive, and does not require highly skilled people to transport, adjust, operate, and maintain.

The specific nature of the invention, as well as other abjects, uses, and advantages thereof, will clearly appear from the following description and from the accompanying drawing, the different views of which are not scale drawings.

DESCRIPTION OF THE PREFERRED EMBODIMENT

As stated above, this invention is very broad. However, as a specific example of one embodiment of the invention, a detailed description will now be made of the specific, preferred embodiment of the invention as an enablement for the manufacture and use of the invention.

Figure 1:
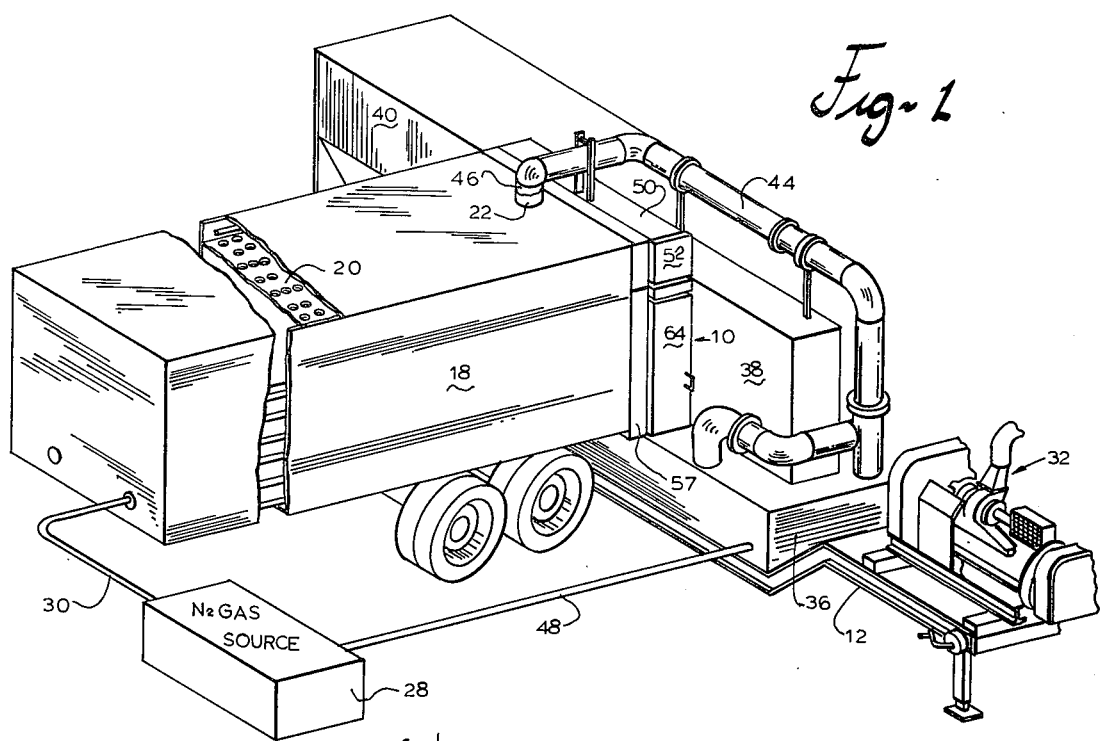
FIG. 1 is a perspective view, with parts broken away for clarity, showing an embodiment of this invention with a trailer in the position to be chilled.
Figure 2:
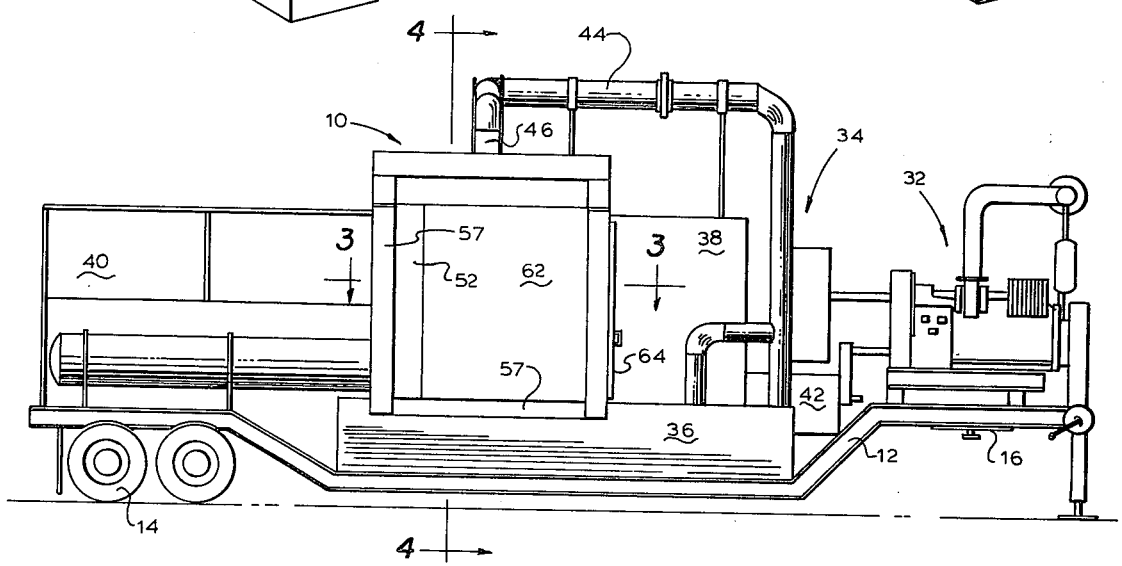
FIG. 2 is a side elevational view of the unit with the trailer not shown.

Referring to the drawings, (FIG. 2) there may be seen alcove 10 upon frame 12. The frame 12 has ground engaging wheels 14 at one end and a fifth wheel 16 at the other and; forming means for moving the frame from one location to another. Since the preferred embodiment is to handle produce, it may be moved from one agricultural area to another or from one field to another in a single agricultural production area.

Figure 3:
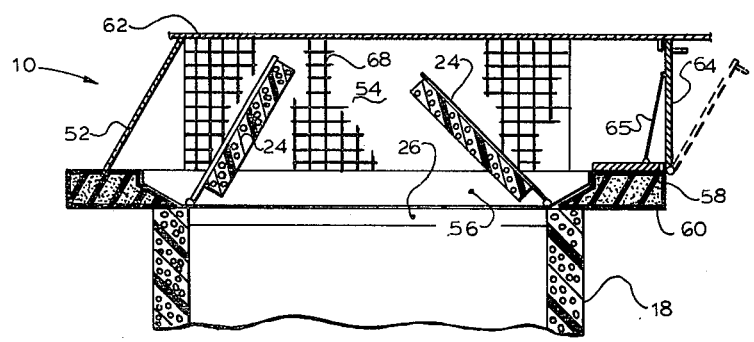
FIG. 3 is a sectional view taken substantially on line 3-3 of FIG. 2, showing the trailer as it would be in position having the vegetation therein chilled.
Figure 4:
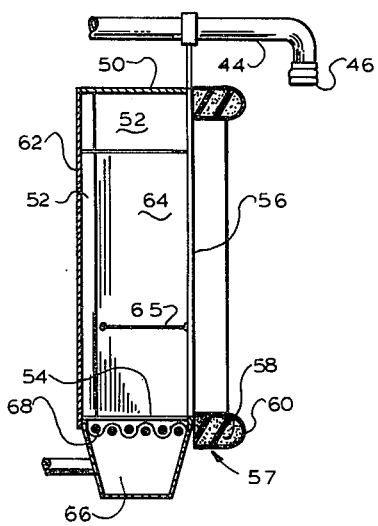
FIG. 4 is a sectional view taken substantially on line 4-4 of FIG. 2 without the trailer.

An insulated trailer 18 (which is a transport container) is backed against the alcove 10. The trailer 18 has sprinkler unit 20 in the top forming a sprinkler means in the container for flushing chilled water over the vegetation therein. Water connection 22 in the top of the trailer 18 near the rear door, or true door, 24 provides for refrigerated water to be introduced into the trailer 18 to flush produce loaded within the trailer. The rear doors, or true doors, 24 are over opening 26 in the rear wall of the trailer 18. (FIG. 3)

Tank 28 contains liquid nitrogen, a liquefied, inert gas. The tank 28 is physically located adjacent to the alcove 10 on the frame 12 and has been shown in the drawings schematically. It will be understood that it could be a portable tank or it could be a tank mounted upon a trailer to be mobile. The tank 28 is connected by hose 30 to the trailer 18 to fill nitrogen tanks (not shown) upon the trailer 18 and also, while being filled, provide gaseous nitrogen for purging the oxygen contained in ambient air from the trailer 18.

Figure 5:
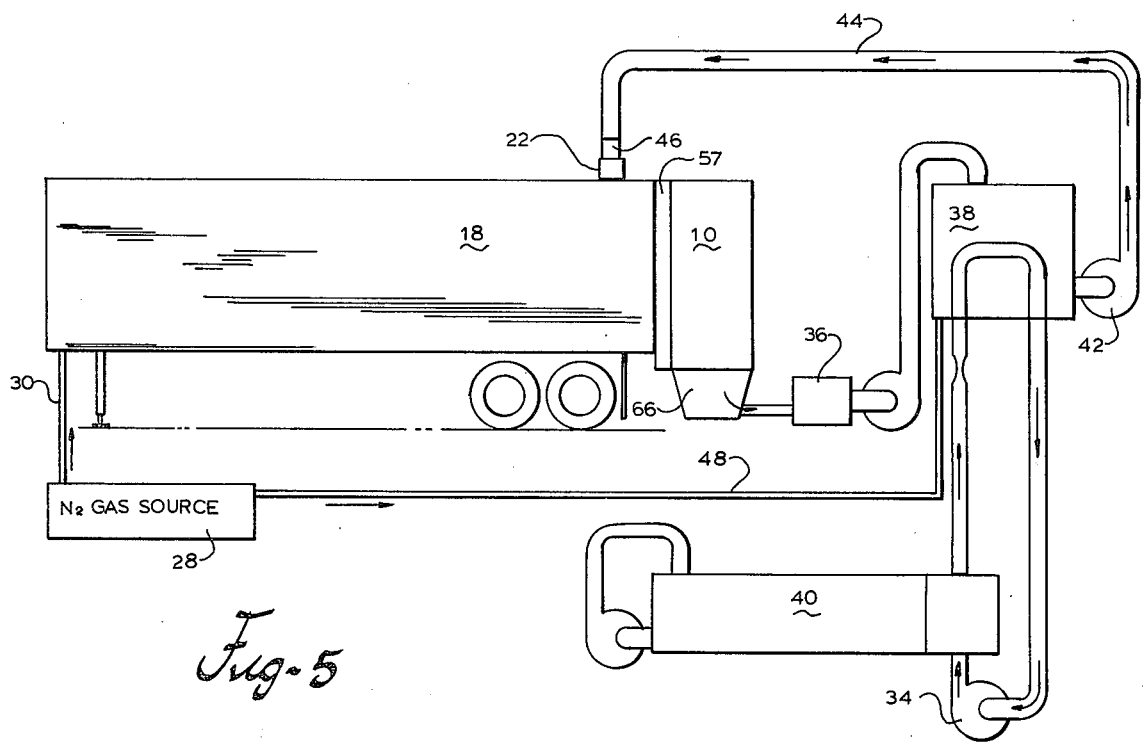
FIG. 5 is a schematic representation of the water and gas flows as well as the basic refrigeration equipment and trailer.

The frame 12 has mounted thereon diesel engine 32, which is a power source connected to refrigeration compressor 34 on the frame 12. Also the frame 12 contains water reservoir 36 and heat exchangers 38 as well as cooling tower 40. The heat exchangers 38 and the water reservoir 36 are closed. It will be understood that a refrigerant, such as ammonia, is compressed by the compressor 34 and cooled by condensor water, the condensor water itself being cooled in the cooling tower 40. (FIG. 5) The refrigerant is then expanded to cool the chilling or flush water for the produce. The reservoirs 36 hold the water and the heat exchangers 38 are used for chilling it.

Pump 42 on the frame 12, also powered by the diesel engine 32, provides a means for pumping the chilled water from the refrigeration unit through top pipe 44 and through flexible connection 46. It is the flexible connection 46 (on the terminal of pipe 44) which connects to the water connection 22 upon the trailer 18. Nitrogen tube 48 connects the tank 28 to the reservoir 36. Nitrogen is introduced into the flush water. It will be understood that as water is cooled, its capacity to absorb or to dissolve gas increases. In this process, the flush water dissolves gas in the heat exchangers 38 and reservior 36 and releases gas in the trailer 18. With the introduction of nitrogen through the tube 48 into the water, there will be an atmosphere of nitrogen above the water in the reservoirs and heat exchangers so there would be no contact of the flush water with oxygen. The gas absorbed and released by the water will be oxygen free.

The top pipe 44 forms a portion of the water conduit connecting the refrigeration means to the sprinkler unit 20 in the container 18. The hose 30 forms a gas conduit connecting source of gas with the trailer or transport container 18. The tube 48 could also be considered injection means for injecting inert gas from the tank 28 into the chilled water at the refrigeration means.

The alcove 10 has roof 50, sides 52, floor 54 and open front 56. The roof, sides, and floor terminate flush with one side of the frame 12 at the open front 56. Deformable material, or air seals 57, project way from the roof 50, sides 52, and floor 54, at the open front 56. The deformable material 57 includes foam rubber 58 which itself is covered with flexible material such as sheet rubber 60. When the trailer is backed agained the alcove 10, a substantially air-tight connection or air lock is formed by the seal 57 between the alcove 10 and the trailer 18. The back of the alcove 10 is closed by back or false door 62. When the trailer 18 is backed against the alcove 10 and true doors, or rear doors, 24 are opened, it may be seen that the false door 62 or back of the alcove 10 forms a closure for the trailer 18 so that the entire space within the trailer is still a closed space for the purposes of containing the the cold, chilled water and surrounding nitrogen gas. The distance from the open front 56 to the back or false door 62 is sufficient for the true doors 24 on the trailer 18 to be opened within the alcove 10. Also the height from the floor 54 to the roof 50 of the alcove 10 from one side to the other is sufficient so that it fits on the outside of the true doors 24 against the back of the trailer 18, which is, of course, around the opening 26 within the trailer. Access within the alcove 10 may be obtained through side door 64 in one of the sides 52. The side door 64 is conveniently spring biased to a closed position.

Drain 66 is within the floor 54 of the alcove 10. A perforated metal screen 68 is over the drain to prevent leaves or the like flushed from the vegetation to enter the chilled water system. (For clarity, the screen 68 is shown in the drawings as a woven wire screen, however, I prefer a perforated metal sheet.) The drain 66 is connected into the reservoir system so that the water from the drain is rechilled through the heat exchangers 38 and again pumped by pump 42 through the piping into the sprinkler means 20 in the top of the trailer 18.

I have found that it is desirable to have a refrigeration unit capable of producing about 150 tons refrigeration and a water pump capable of handling about 2,000 gallons of water per minute for satisfactory operation in a trailer having 2200 cubic feet or having about 50,000 lbs of vegetation.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | | | |
|---|---|---|---|
| 10 | alcove | 42 | pump |
| 12 | frame | 44 | top pipe |
| 14 | ground engaging wheels | 46 | flexible connection |
| 16 | fifth wheel | 48 | tube |
| 18 | trailer | 50 | roof |
| 20 | sprinkler unit | 52 | sides |
| 22 | water connection | 54 | floor |
| 24 | rear door (true door) | 56 | open front |
| 26 | opening | 57 | air seal |
| 28 | tank | 58 | foam rubber |
| 30 | hose | 60 | sheet rubber |
| 32 | diesel engine | 62 | false door |
| 34 | compressor | 64 | side door |
| 36 | reservoir | 65 | spring |
| 38 | heat exchangers | 66 | drain |
| 40 | cooling tower | 68 | screen |

I claim as my invention:
1. The process involving
   a. vegetation in a
   b. transport container having
      (i) an opening in the walls thereof with
      (ii) at least one door over the opening,
   c. sprinkler means in the container for flushing chilled water over the vegetation therein,
   wherein the improved method comprises:
   d. moving the container against an alcove,
   e. forming an air-tight seal between the alcove and the container,
   f. opening the door into the alcove,
   g. flushing the vegetation in the container by pumping chilled water into the sprinkler means within the container,
   h. draining the water from the container into the alcove,
   i. re-chilling the water from the alcove and pumping it again through the sprinkler means, then
   j. ceasing the pumping of the water,
   k. closing the doors within the alcove, and
   l. moving the container away from the alcove.

2. The invention as defined in claim 1 including all of the limitations (a) through (l) with the addition of the following limitations:
   m. purging oxygen-containing air from within the container by
   n. introducing an inert gas into the container while it is sealed to the alcove,
   o. said alcove being substantially air-tight.

3. The invention as defined in claim 2 including all of the limitations (a) through (o) with the addition of the following limitations:
   p. maintaining an inert gas cap over the chilling water in all reservoirs and heat exchanges during the pumping and chilling cycle so that
   q. oxygen-containing air is not absorbed into the water during the water chilling process.

4. Structure for hydro-cooling and purging oxygen from vegetation in
   a. a transport container with
   b. an opening therein,
   c. true doors on the container at the opening which may be opened and closed,
   d. sprinkler means in the container for flushing chilled water over vegetation therein,
   e. refrigeration means for chilling water, and
   f. a source of liquefied inert gas;
   wherein the improvement comprises:
   g. an alcove having
      (i) roof
      (ii) sides,
      (iii) floor,
      (iv) back, and
      (v) open front,
   h. air seal means on the open front of the roof, sides and floor for forming an air-tight connection between the alcove and the container around the opening,
   j. a water drain in the floor of the alcove,
   k. a water conduit connecting the refrigeration means to the sprinkler in the container so that water may be pumped from the refrigeration means to the container which will drain from the container through the water drain in the floor of the alcove, and
   l. a gas conduit connecting the source of gas with the container so that oxygen containing air may be purged from the container while the container is connected to the alcove and the refrigerated water is cooling the vegetation in the container.

5. The invention as defined in claim 4 including all of the limitations (a) through (l) with the addition of the following limitations:
   m. a frame,
   n. said alcove and refrigeration means mounted on said frame, and
   o. the water drain connected to a water reservoir which is connected to refrigeration means so that the water may be rechilled and recirculated over the vegetation in the container.

6. The invention as defined in claim 5 including all of the limitations (a) through (o) with the addition of the following limitations:
   p. said refrigerated means including a power source, compressor, condensor and pumps, all of which are on said frame, and
   q. transport means on the frame for moving the frame to different locations.

7. The invention as defined in claim 4 including all of the limitations (a) through (l) with the addition of the following limitation:
   m. injection means for injecting inert gas from the source into the chilled water at the refrigeration means so that the water being chilled is not in contact with an oxygen containing atmosphere.

8. The invention as defined in claim 4 including all of the limitations (a) through (l) with the addition of the following limitations:
   m. a frame,
   n. transport means on the frame for moving the frame from one location to another,
   o. said alcove on said frame.

9. The invention as defined in claim 4 including all of the limitations (a) through (l) with the additional limitation of:
   m. a door into the alcove so that the true doors of the container may be opened and closed to facilitate operation.

10. The invention as defined in claim 9 including all of the limitations (a) through (m) with the addition of the following limitations:
    n. a frame,
    o. transport means on the frame for moving the frame from one location to another,
    p. said alcove on said frame.

11. The invention as defined in claim 9 including all of the limitations (a) through (m) with the addition of the following limitation:
    n. injection means for injecting inert gas from the source into the chilled water at the refrigeration means so that the water being chilled is not in contact with an oxygen containing atmosphere.

12. The invention as defined in claim 9 including all of the limitations (a) through (m) with the addition of the following limitations:
    n. a frame,
    o. said alcove and refrigeration means mounted on said frame, and
    p. the water drain connected to a water reservior which is connected to refrigeration means so that the water may be rechilled and recirculated over the vegetation in the container.

13. The invention as defined in claim 12 including all of the limitations (a) through (p) with the addition of the following limitations:
    q. said refrigerated means including a power source, compressor, condensor and pumps, all of which are on said frame, and
    r. transport means on the frame for moving the frame to different locations.

14. The invention as defined in claim 13 including all of the limitations (a) through (r) with the addition of the following limitation:
    s. injection means for injecting inert gas from the source into the chilled water at the refrigeration means so that the water being chilled is not in contact with an oxygen containing atmosphere.

* * * * *